United States Patent
Chagny et al.

(10) Patent No.: US 7,064,949 B2
(45) Date of Patent: Jun. 20, 2006

(54) PROGRESSIVE IMPEDANCE CONNECTOR

(75) Inventors: Marie-Pascale Chagny, Austin, TX (US); Steven L. Williams, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/777,374

(22) Filed: Feb. 12, 2004

(65) Prior Publication Data

US 2005/0180070 A1 Aug. 18, 2005

(51) Int. Cl.
*H01H 47/00* (2006.01)

(52) U.S. Cl. ........................................ 361/220

(58) Field of Classification Search ................ 361/212, 361/220, 56
See application file for complete search history.

(56) References Cited

U.S. PATENT DOCUMENTS

| | | | |
|---|---|---|---|
| 5,633,780 A | 5/1997 | Cronin | |
| 5,862,349 A * | 1/1999 | Cho et al. | 710/304 |
| 5,943,482 A * | 8/1999 | Culley et al. | 710/302 |
| 6,151,202 A * | 11/2000 | Mueller et al. | 361/212 |
| 6,302,714 B1 * | 10/2001 | Bolognia et al. | 439/157 |
| 6,447,316 B1 | 9/2002 | Jon et al. | |
| 6,468,097 B1 | 10/2002 | Bernstein et al. | |

* cited by examiner

*Primary Examiner*—Stephen W. Jackson
*Assistant Examiner*—Boris Benenson
(74) *Attorney, Agent, or Firm*—Haynes and Boone, LLP

(57) ABSTRACT

A connector includes a base and a connector member with a first end connected to the base and a second end opposite the first end. A first region on the connector member, located adjacent the first end, has a first impedance. A second region on the connector member, located adjacent the second end, has a second impedance greater than the first impedance. When an electro-statically charged device is connected to the connector, the electrostatic charge is dissipated relatively slowly due to initial contact with the second region of increased impedance, lowering the voltage resulting from the connection in order to protect static sensitive circuits coupled to the connector.

9 Claims, 3 Drawing Sheets

006
PROGRESSIVE IMPEDANCE CONNECTOR

BACKGROUND

The present disclosure relates generally to information handling systems, and more particularly to a connector for connecting an electro-statically charged device to an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sensitive to electrostatic discharges (ESDs). Often, an ESD event happens when connecting a charged device, such as a USB device or other peripherals, to the information handling system. As the charged device is connected to the information handling system, the charge on the device is rapidly discharged, resulting in a high voltage transient that can permanently damage static sensitive circuits in the information handling system. A variety of ESD protection schemes have been devised to deal with this problem.

An ESD protection network can include of a set of primary shunt devices, a series resistor, and a set of secondary shunt devices. Other schemes include the use of a plurality of shunt devices. The shunt devices are typically built using diodes, although transistors can be used as well. External components, including diodes and varistors, can also be added on to the system board to supplement the ESD protection network. The problem with these and other ESD protection networks is that series resistors and shunt devices can reduce signal integrity, take up board space, and result in an added cost to the information handling system. In addition, the ESD protection networks are limited in the amount of discharge they can safely absorb.

Accordingly, it would be desirable to provide a connector for connecting an electrostatically charged device to an information handling system absent the disadvantages found in the prior devices and methods discussed above.

SUMMARY

According to one embodiment, a connector includes a base and a connector member with a first end connected to the base and a second end opposite the first end. A first region on the connector member, located adjacent the first end, has a first impedance. A second region on the connector member, located adjacent the second end, has a second impedance greater than the first impedance.

A principal advantage of this embodiment is that a charged device may be connected to an information handling system via the connector, minimizing the creation of a voltage due to an electrostatic discharge that may damage static sensitive circuits within the information handling system. This is achieved at relatively low cost and without reducing signal integrity or taking up board space.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
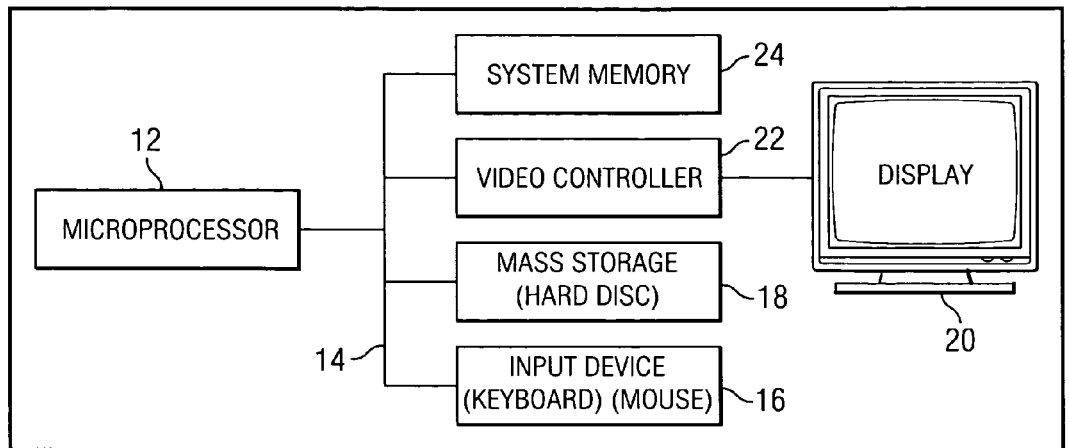
FIG. 1 is a diagrammatic view illustrating an embodiment of an information handling system.

In one embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. A housing 26 contains the components of information handling system 10. Housing 26 may be a single housing or a plurality of housings. It should be understood that other busses and intermediate circuits can be deployed between the components described above and microprocessor 12 to facilitate interconnection between the components and the microprocessor.

Figure 2:
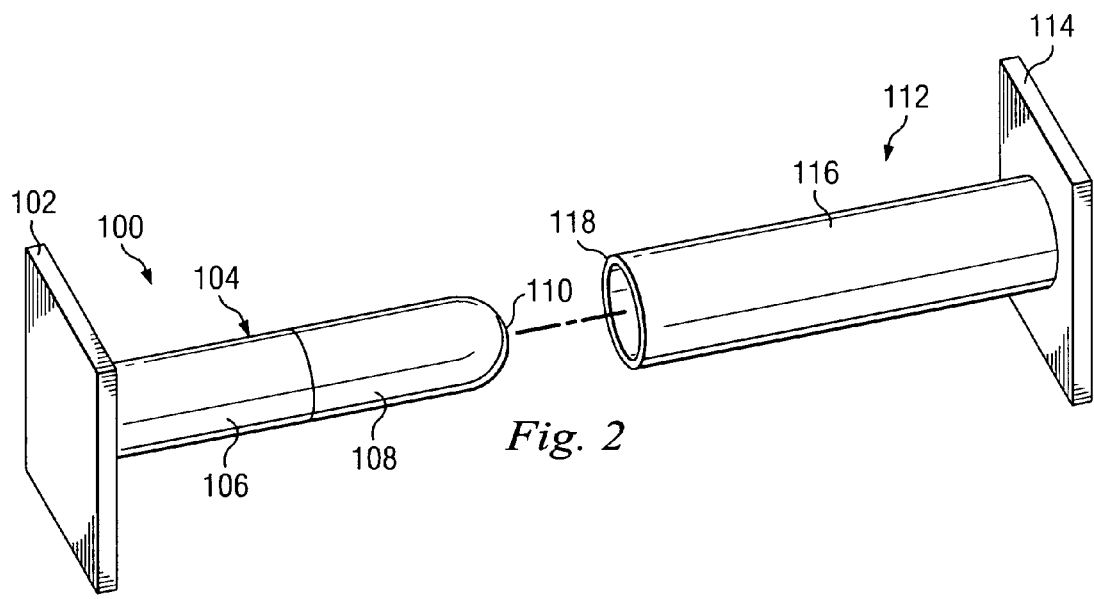
FIG. 2 is a perspective view illustrating an embodiment of a connector member and a charged connector.

A connection device 100, FIG. 2, is coupled to a static sensitive circuit (not shown) in information handling system 10. Connection device 100 includes a base 102 and an elongated connector member or probe 104 mounted to the base 102. Connector member 104 includes a region 106 adjacent to the base 102, the region 106 having a first impedance. A region 108 is adjacent region 106, the region 108 having a second impedance which is greater than that of the first impedance of region 106. Regions 106 and 108 on connector member 104 can be formed a number of ways, including providing a member made of a first material having the first impedance and coating a portion of the member with a second material having the second impedance. A terminal end 110 is located in region 108, at the end of connector member 104 opposite the base 102.

In operation, a charged connector 112 is provided that is coupled to a charged device (not shown) that is to be connected to information handling system 10. The charged connector 112 includes a base 114. A mating connector member 116 is mounted to the base 114, the mating connector member 116 including a receiving end 118 at a terminal end of charged connector 112 opposite base 114.

Figure 3:
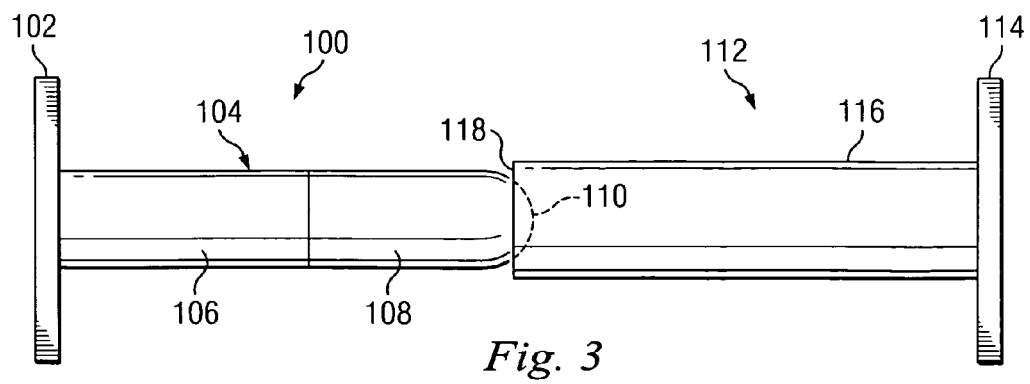
FIG. 3 is a side view illustrating an embodiment of a connector member and a charged connector matingly engaging at a first region on the connector member.

Charged connector 112 is connected to information handling system 10 by matingly engaging receiving end 118, FIG. 3, with terminal end 110. This brings charged connector 112 into contact with region 108 of connector member 104. Due to the impedance of region 108 the electrostatic discharge of charged device (not shown) from charged connector 112, which passes through connection device 100 and into information handling system 10, occurs relatively slowly.

Figure 4:
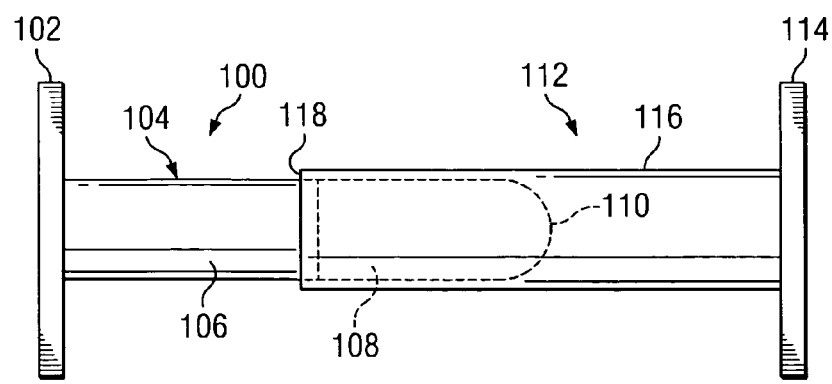
FIG. 4 is a side view illustrating an embodiment of a connector member and a charged connector engaging at a second region on the connector member.

As mating connector member 116 continues mating with connector member 104, it moves along region 108 until receiving end 118 comes into contact with region 106, FIG. 4. The impedance of region 106 is lower than that of region 108, and ideally, region 106 would have no impedance in order to provide an ideal connection of the charged device (not shown) to information handling system 10. By engaging charged connector 112 with region 108, the charge has dissipated enough so that engagement of charged connector 112 to connection device 100 through contact of receiving end 118 with region 106 will not generate a high enough voltage to damage static sensitive circuit (not shown) in information handling system 10. Further mating of charged connector 112 to connection device 100 engages more of mating connector member 116 with region 106, providing the connection of charged device (not shown) to information handling system 10.

Figure 5:
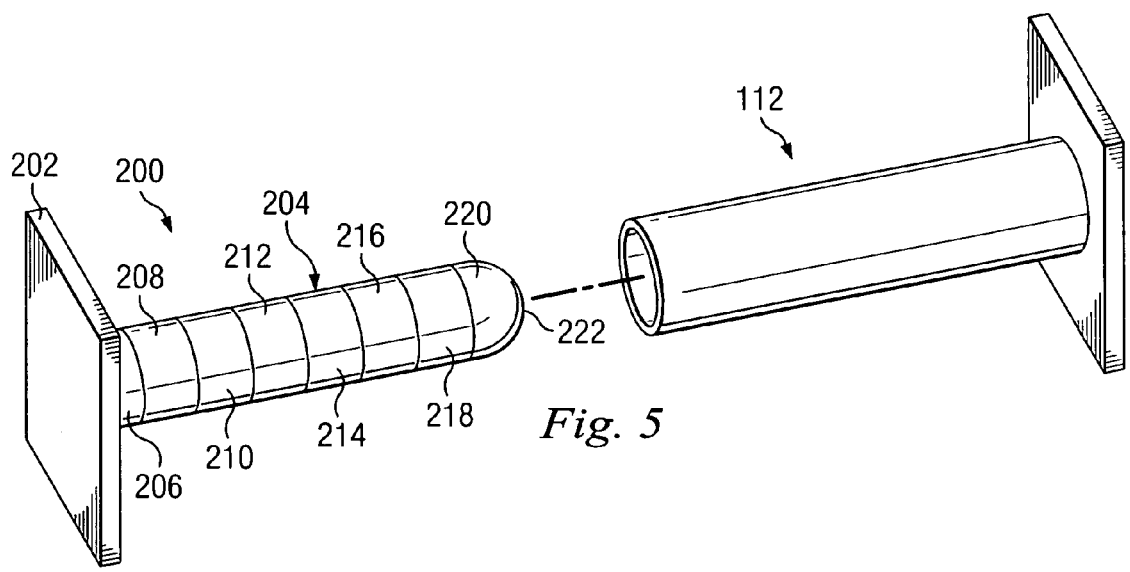
FIG. 5 is a perspective view illustrating another embodiment of a connector member and a charged connector.

In another embodiment, FIG. 5, a connection device 200, is coupled to a static sensitive circuit (not shown) in information handling system 10. Connection device 200 may be engaged with charged connector 112, and includes a base 202 and a connector member 204 mounted to the base 202. Connector member 204 includes a plurality of regions, for example, regions 206, 208, 210, 212, 214, 216, 218, and 220 along its length. Region 206 is located adjacent the base 202 and has a first impedance. Region 208 is located adjacent region 206 and has a second impedance that is greater than the first impedance. Successive adjacent regions 210, 212, 214, 216, 218, and 220 are such that the impedance of connector member 204 varies along its length so that the impedance is greatest in region 220 and least in region 206. Alternatively, the impedance can be made greatest and least in regions between region 206 and region 220. Also, additional regions of differing impedance can be added, eventually resulting in the impedance of connector member 204 varying continuously along its length. Regions 206-220 on connector member 204 can be formed a number of ways, including providing a member made of a material selectively doped to give the member an impedance that varies along its length. A terminal end 222 is located in region 220, at the end of connector 204 opposite the base 202.

In operation, connection device 200 functions in the same manner as connection device 100, FIGS. 2, 3, and 4.

Figure 6:
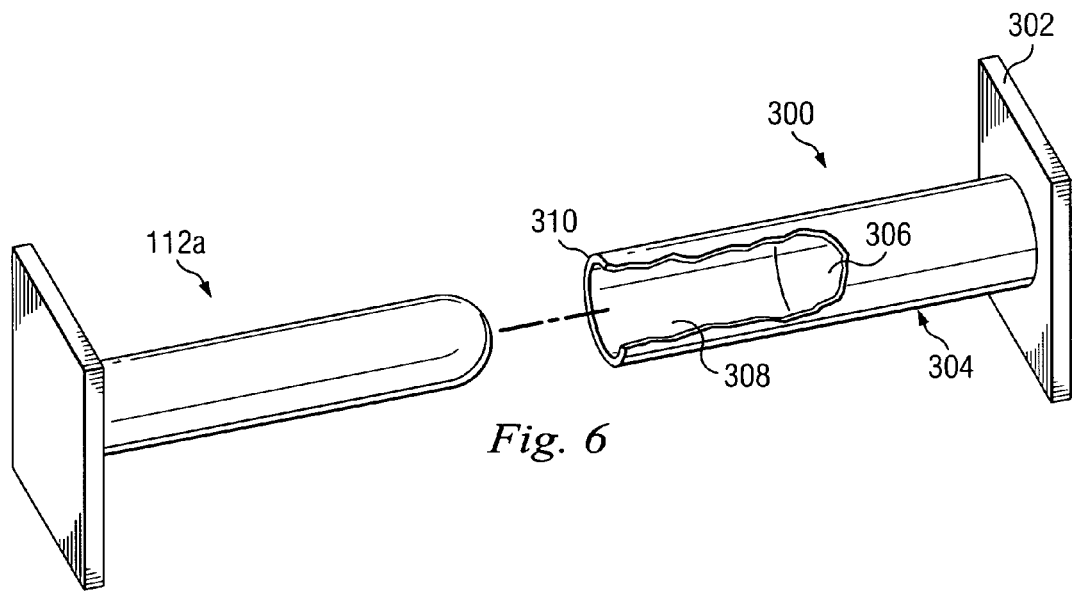
FIG. 6 is a perspective view illustrating another embodiment of a connector member and a charged connector.

In yet another embodiment, FIG. 6, a connection device 300 is coupled to a static sensitive circuit (not shown) in information handling system 10. Connection device 300 includes a base 302 and a connector member 304 mounted to the base 302. Connector member 304 includes a region 306 adjacent to the base, region 306 having a first impedance. A region 308 is adjacent region 306, region 308 having a second impedance which is greater than that of region 306. Regions 306 and 308 on connector member 304 can be formed a number of ways, including providing a member made of a first material having the first impedance and coating a portion of the member with a second material having the second impedance. A terminal end 310 is located in region 308, at the end of connector member 304 opposite the base 302.

In operation, connection device 300 functions in the same manner as connection device 100, FIGS. 2, 3, and 4, with the exception that connector member 304 is a female connector member which is engaged by a male charged connector 112*a*.

Figure 7:
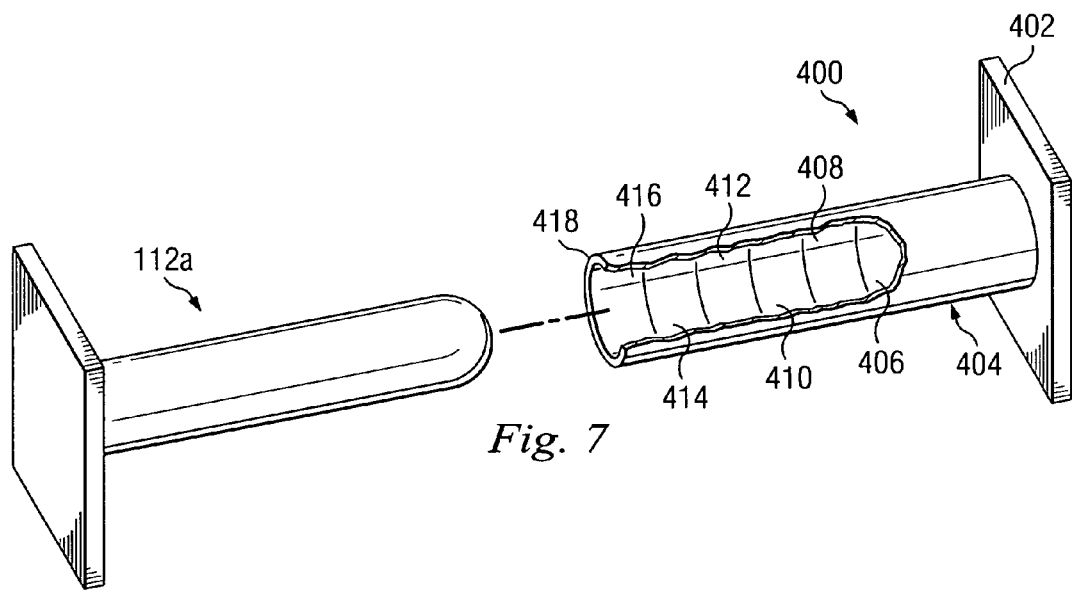
FIG. 7 is a perspective view illustrating another embodiment of a connector member and a charged connector.

In yet another embodiment, FIG. 7, a connection device 400 is coupled to a static sensitive circuit (not shown) in information handling system 10. Connection device 400 includes a base 402 and a connector member 404 mounted to the base 402. Connector member 404 includes a plurality of regions, for example, regions 406, 408, 410, 412, 414, and 416 along its length. Region 406 is located adjacent the base 402 and has a first impedance. Region 408 is located adjacent region 406 and has a second impedance that is greater than the first impedance. Successive adjacent regions 410, 412, 414, and 416 are such that the impedance of connector member 404 varies along its length so that the impedance is greatest in region 416 and least in region 406. Alternatively, the impedance can be made greatest and least in regions between region 406 and region 416. Also, additional regions of differing impedance can be added, eventually resulting in the impedance of connector member 404 varying continuously along its length. Regions 406–416 on connector member 404 can be formed a number of ways, including providing a member made of a material selectively doped to give the member an impedance that varies along its length. An end 418 is located in region 416, at the end of connector member 404 opposite the base 402.

In operation, connection device 400 functions in the same manner as connection device 100, FIGS. 2, 3, and 4, with the exception that the connector member 404 is a female connector member which is engaged by the male charged connector 112*a*.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system comprising:
    a housing;
    a microprocessor mounted in the housing;
    a storage coupled to the microprocessor;
    a static sensitive circuit located in the housing;
    a connector member having a varying mating surface contact with a charged connector,
    the connector member, located in the housing and coupled to the static sensitive circuit, which discharges static energy distributed over time due to an impedance of the connector that varies along its length, the impedance varying in response to varying the mating surface contact with a non-metal coating between a portion of the connector member and the charged connector.

2. The information handling system of claim 1 wherein the connector includes a first region having a first impedance and a second region have a second impedance which is greater than the first impedance.

3. The information handling system of claim 2 wherein the first region includes a metal.

4. The information handling system of claim 2 wherein the first region includes a metal alloy.

5. The information handling system of claim 2 wherein the second region includes a polymer.

6. The information handling system of claim 2 wherein the second region includes a resistive polymer.

7. The information handling system of claim 1 wherein the static sensitive circuit is a microprocessor.

8. The information handling system of claim 1 wherein the static sensitive circuit is a memory device.

9. The information handling system of claim 1 wherein the static sensitive circuit is a bridge chip.

* * * * *